(12) United States Patent
King

(10) Patent No.: US 11,554,391 B1
(45) Date of Patent: Jan. 17, 2023

(54) POINT OF USE MICRON FILTERED AIR WAND

(71) Applicant: James Alan King, Stephenville, TX (US)

(72) Inventor: James Alan King, Stephenville, TX (US)

( * ) Notice: Subject to any disclaimer, the term of this patent is extended or adjusted under 35 U.S.C. 154(b) by 999 days.

(21) Appl. No.: 16/256,170

(22) Filed: Jan. 24, 2019

Related U.S. Application Data

(60) Provisional application No. 62/625,794, filed on Feb. 2, 2018.

(51) Int. Cl.
| | |
|---|---|
| *B01D 46/00* | (2022.01) |
| *B01D 46/24* | (2006.01) |
| *B01D 46/42* | (2006.01) |
| *B08B 5/02* | (2006.01) |

(52) U.S. Cl.
CPC ............ *B08B 5/02* (2013.01); *B01D 46/0004* (2013.01); *B01D 46/2414* (2013.01); *B01D 46/4227* (2013.01); *B01D 2279/55* (2013.01)

(58) Field of Classification Search
CPC ............ B01D 46/0004; B01D 46/2414; B01D 46/4227; B01D 2279/55; B08B 5/02
USPC .............. 55/357, 383, 473, 505, 385.1, 503; 604/49, 902
See application file for complete search history.

(56) References Cited

U.S. PATENT DOCUMENTS

| | | | | |
|---|---|---|---|---|
| 4,986,839 | A * | 1/1991 | Wertz ........................ | B08B 5/04 55/467 |
| 5,597,385 | A * | 1/1997 | Moerke ................... | B08B 15/04 55/357 |
| 7,112,231 | B2 * | 9/2006 | Cote, Jr. ................ | B01D 45/06 55/DIG. 28 |
| 7,520,919 | B2 * | 4/2009 | Caleffi ................ | A61M 1/3641 55/502 |
| 7,780,754 | B2 * | 8/2010 | Hefele .................... | F16L 55/24 81/57.44 |

* cited by examiner

*Primary Examiner* — Minh Chau T Pham
(74) *Attorney, Agent, or Firm* — Plager Schack LLP; Mark H. Plager; Kara Verryt

(57) ABSTRACT

A point of use air wand with a built in filtration system may include a wand including a filter body; a filter housed within the filter body; an input endcap attached to a first end of the filter body, the input endcap operatively attached to an air source; and an accumulator endcap attached to a second end of the filter body. Forced air may enter the wand through the input endcap, flow through the filter, and then out of the wand through the accumulator endcap.

6 Claims, 5 Drawing Sheets

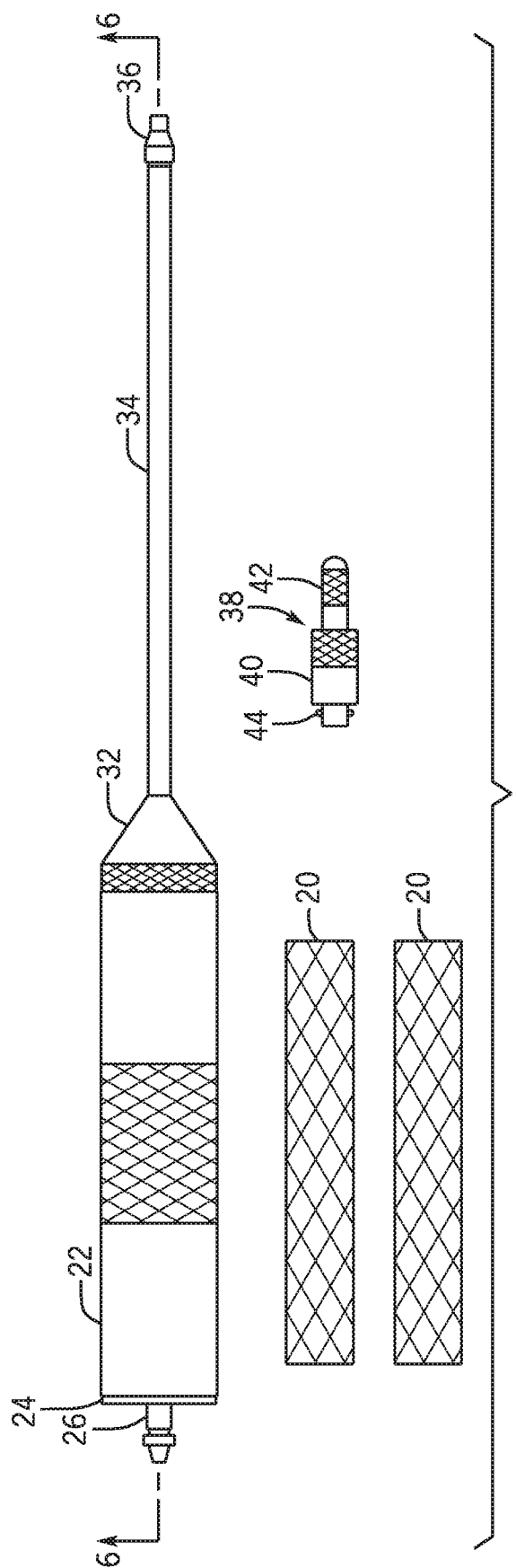
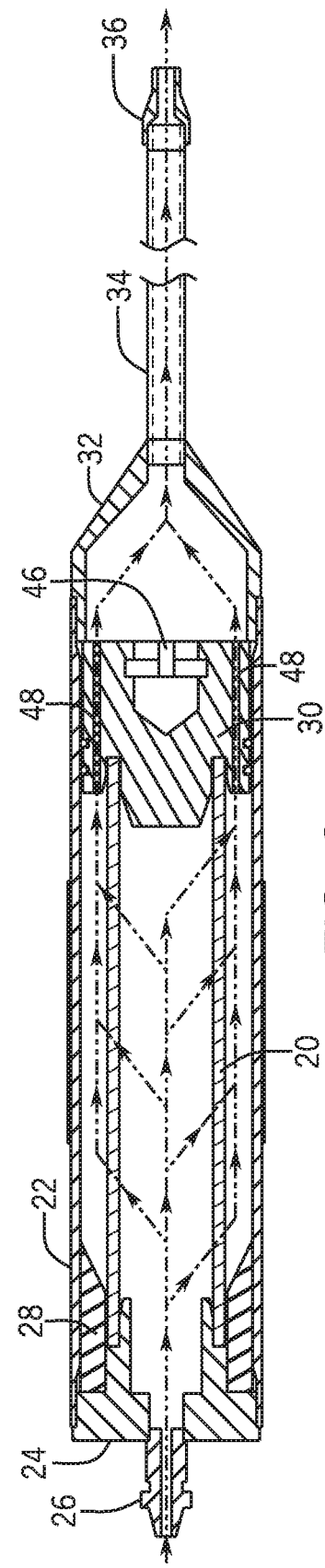
FIG. 5
FIG. 6

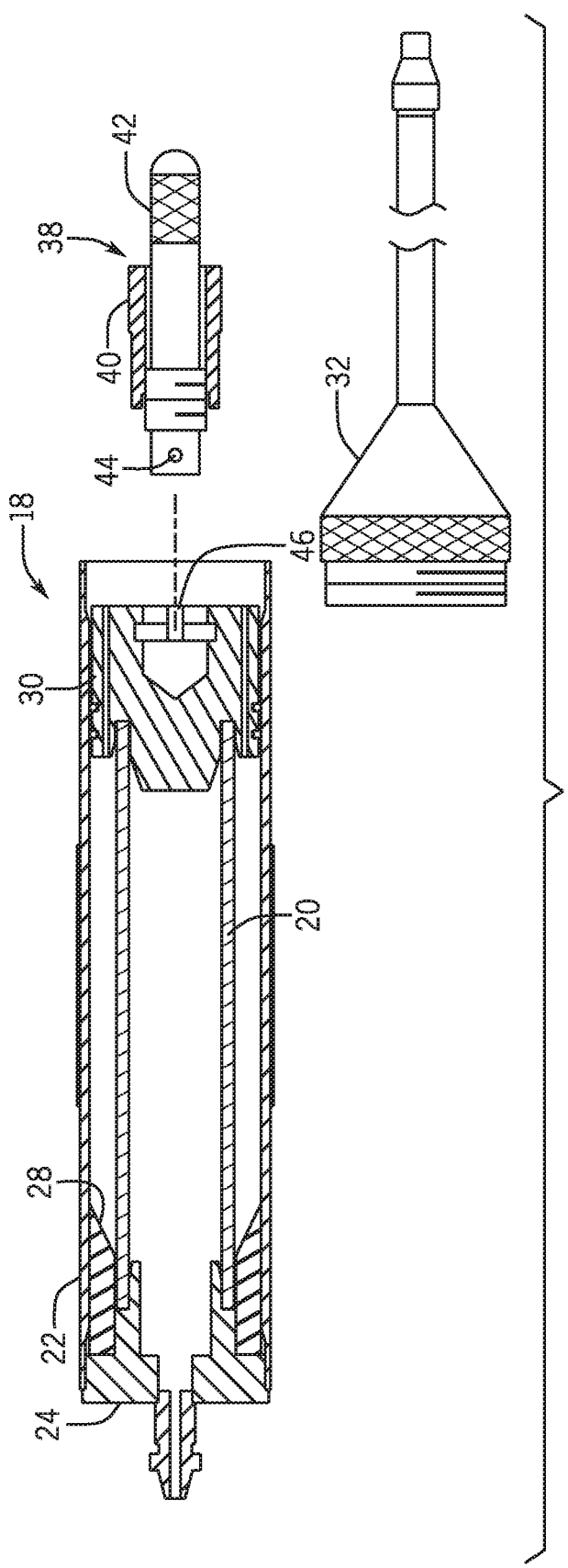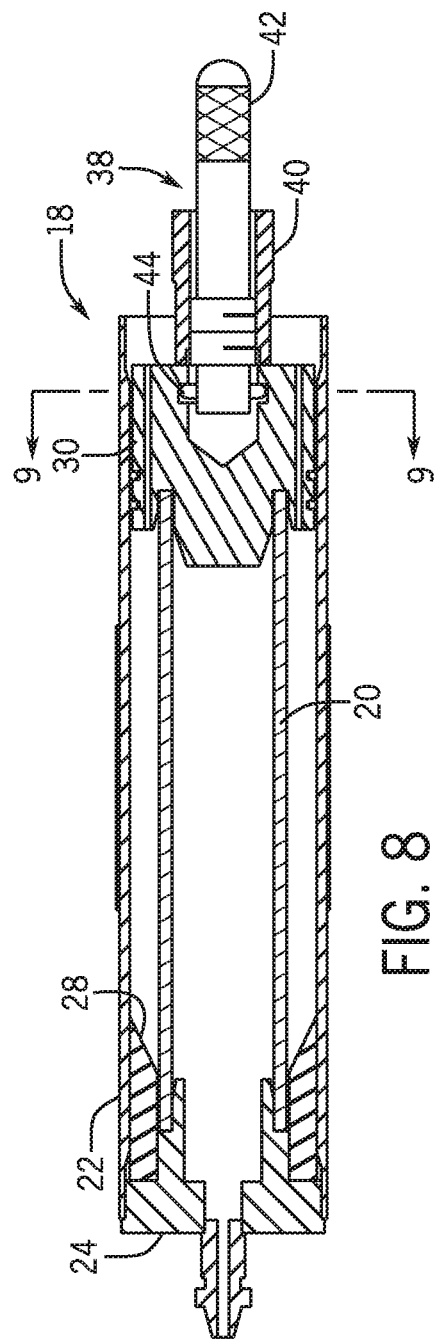
FIG. 7
FIG. 8

US 11,554,391 B1

POINT OF USE MICRON FILTERED AIR WAND

RELATED APPLICATION

This application claims priority to provisional patent application U.S. Ser. No. 62/625,794 filed on Feb. 2, 2018, the entire contents of which is herein incorporated by reference.

BACKGROUND

The embodiments herein relate generally to cleaning machinery including the use of compressed air, and more particularly, to a point of use micron filtered air wand.

Food plants use compressed air to dry equipment after sanitation. However, conventionally and as shown in FIG. 2, the compressed air is only filtered by a house filter proximate to the air source and, thus, the compressed air is not filtered at the point of use. Rather a conventional unfiltered air wand 17 is attached to the air source. As a result, particularly when it comes to food contact areas, there is a risk of contamination.

Similar systems are used in the medical field, wherein contamination is also a concern.

Therefore, what is needed is an air wand including a built in filter to provide a point of use filtered air wand, preventing or decreasing the likelihood of contamination of the surface being blown off.

SUMMARY

Some embodiments of the present disclosure include a point of use air wand with a built in filtration system. The air wand may include a wand including a filter body; a filter housed within the filter body; an input endcap attached to a first end of the filter body, the input endcap operatively attached to an air source; and an accumulator endcap attached to a second end of the filter body. Forced air may enter the wand through the input endcap, flow through the filter, and then out of the wand through the accumulator endcap, thus providing a point of use air wand with a filtration system that may be in addition to a house filtration system attached to the air source.

BRIEF DESCRIPTION OF THE FIGURES

The detailed description of some embodiments of the invention is made below with reference to the accompanying figures, wherein like numerals represent corresponding parts of the figures.

FIG. 5 is an elevation view of one embodiment of the present disclosure.

FIG. 6 is a cross-sectional view of one embodiment of the present disclosure.

FIG. 7 is a cross-sectional view of one embodiment of the present disclosure, showing replacement of the filter.

FIG. 8 is a cross-sectional view of one embodiment of the present disclosure, showing replacement of the filter.

DETAILED DESCRIPTION OF CERTAIN EMBODIMENTS

Figure 1:
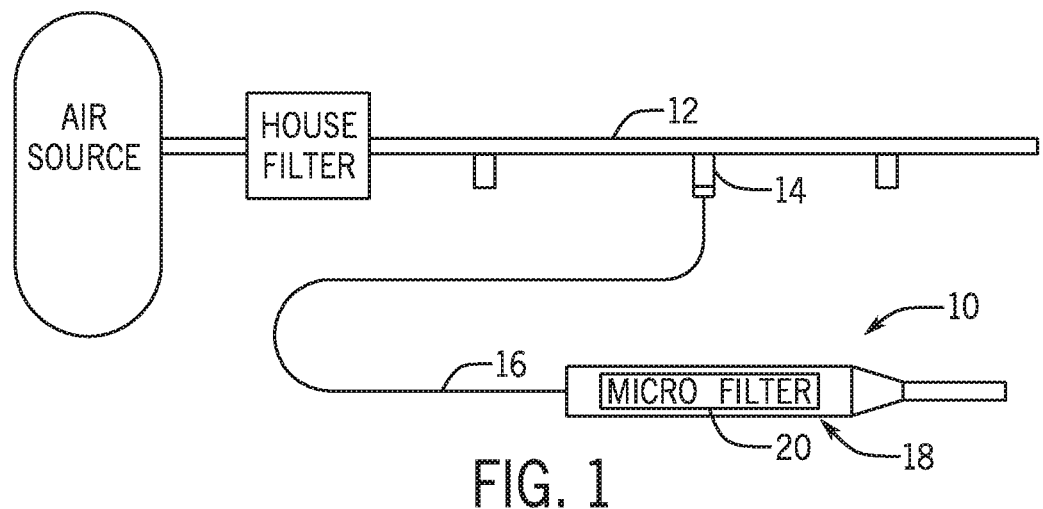
FIG. 1 is a schematic diagram of one embodiment of the present disclosure.
Figure 2:
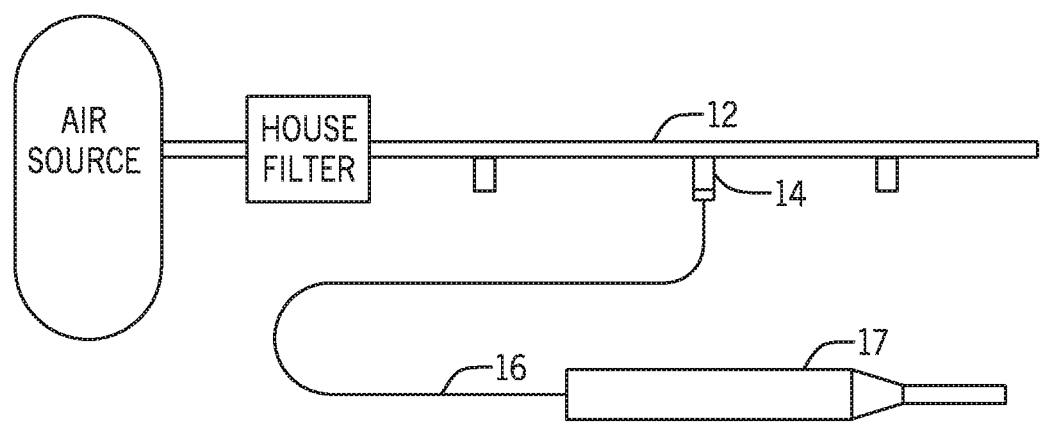
FIG. 2 is a schematic diagram of the prior art.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a point of use filtered air wand and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the device of the present disclosure may be related in the following exemplary fashion. It is not intended to limit the scope or nature of the relationships between the various elements and the following examples are presented as illustrative examples only.

By way of example, and referring to FIGS. 1-10, some embodiments of the present disclosure include an air wand 18 with a built in filtration system, such that when the air wand 18 is being used to clean an area, such as an area in a food manufacturing plant, filtration is occurring as close to point of use as possible. As shown in, for example, FIG. 1, the air wand 10 may include a wand 18 housing a filter 20, wherein the wand 18 is operatively attached to an air source. Specifically, the air source may be operatively attached to a house filter with a pipe 12 extending therefrom. The pipe 12 may include at least one pipe access port 14 to which a hose is attached 16, and the hose 16 may be operatively attached to the wand 18.

Figure 3:
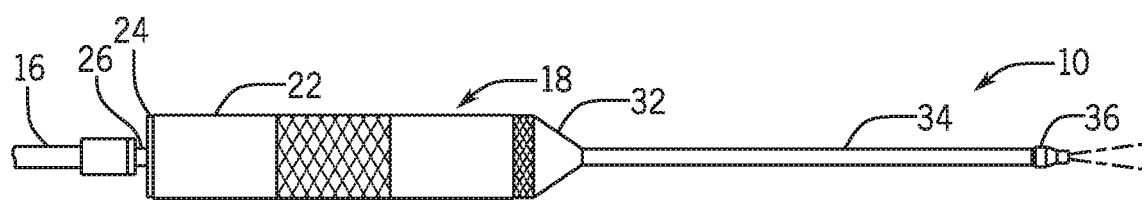
FIG. 3 is a side elevation view of one embodiment of the present disclosure.
Figure 4:
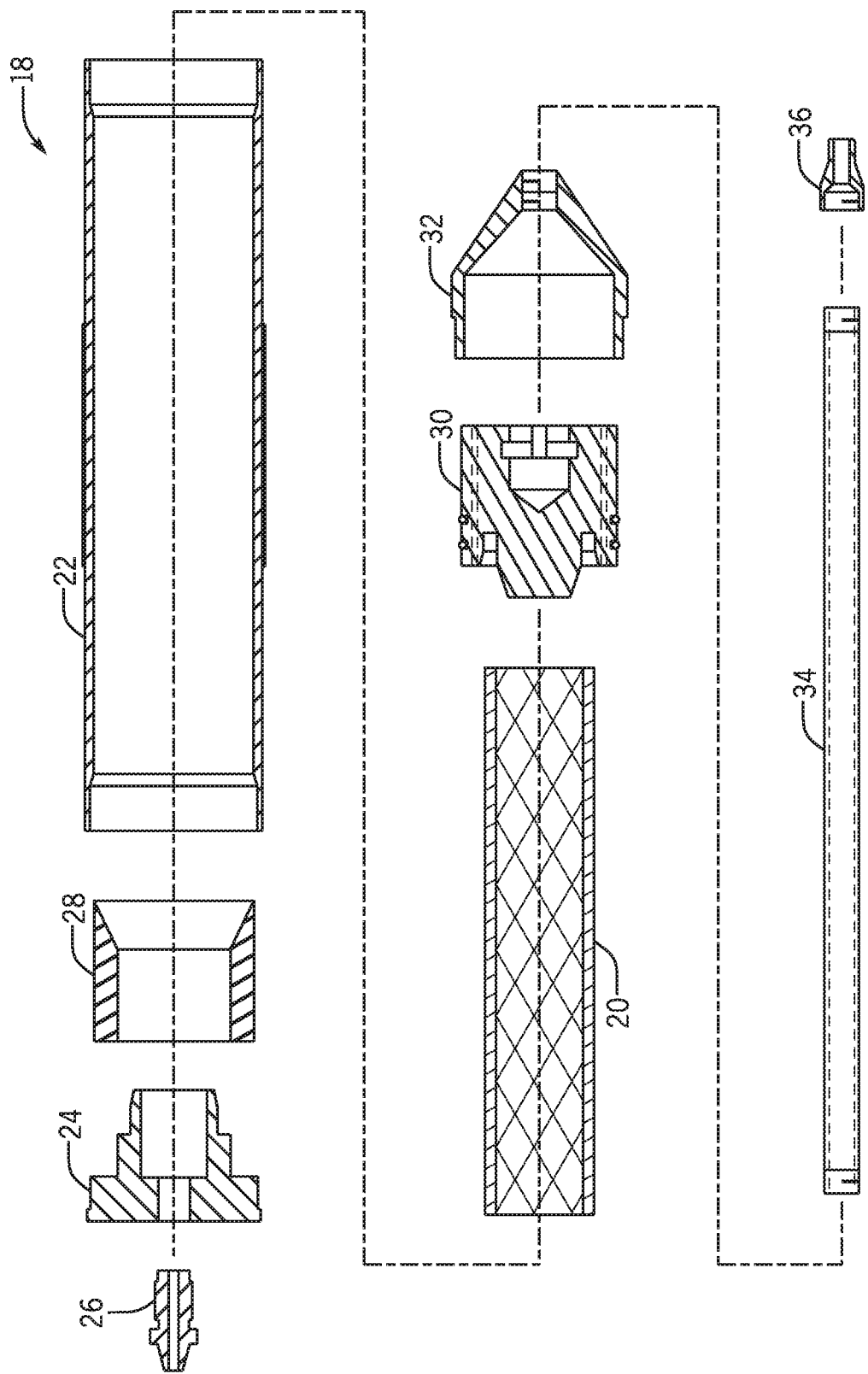
FIG. 4 is an exploded cross-sectional view of one embodiment of the present disclosure.
Figure 9:
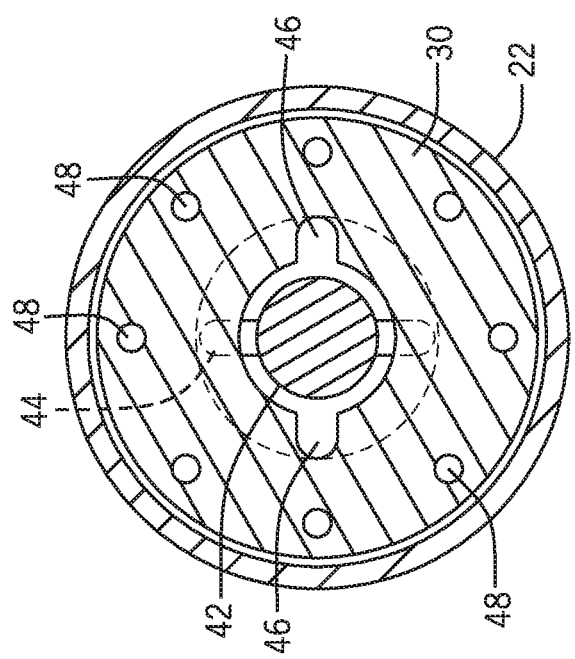
FIG. 9 is a cross-sectional view of one embodiment of the present disclosure, taken along line 9-9 in FIG. 8.

As shown in FIG. 3, the wand 18 may include a filter body 22 housing the filter 20, an input endcap 24 attached to a first end of the filter body 22 and an accumulator endcap 32 attached to a second end of the filter body. The input endcap 24 may be attached to a hose connector 26 designed to engage with the hose 16, while the accumulator endcap 32 may be attached to a blower extension 34 with a nozzle head 36 for dispensing filtered air from the point of use air wand 10. Alternatively, the accumulator endcap 32 may be attached directly to the nozzle head 36 and, thus, the blower extension 34 may be an optional component.

As shown in more detail in FIGS. 4-10, the wand 18 may comprise the hose connector 26 designed to engage with the input endcap 2, which may operatively attach to a filter guide. The filter guide 28 may be sandwiched between edges of the input endcap 24 and the interior surface of the filter body 22. At least one filter 20 may be positioned within the filter body 22 between the filter guide 28 and an inner lip of the input endcap 24, as shown in FIG. 6. The filter 20 may extend along a length of the filter body 22, but may ultimately have a length shorter than that of the filter body 22. A keyed output endcap 30 may be positioned within an end of the filter body 22 distal from the input endcap 24, wherein the keyed output endcap 30 includes slots into which the end of the filter 22 distal from the input endcap 24 is secured. The keyed output endcap 30 may include a plurality of air passages 48 extending therethrough, such that when air flows from the hose 16 through the hose connector 26 and into the filter body 22, the air must pass through the filter 20 before exiting the wand 18 through the air passages 48 in the keyed output endcap 30. Other than the air passages 48 in the keyed output endcap 30, the keyed output endcap 30 may have a structure suitable for blocking airflow through the end of the wand 18, thus requiring that the compressed air flows through the filters 20 before exiting the wand 18.

Figure 10:
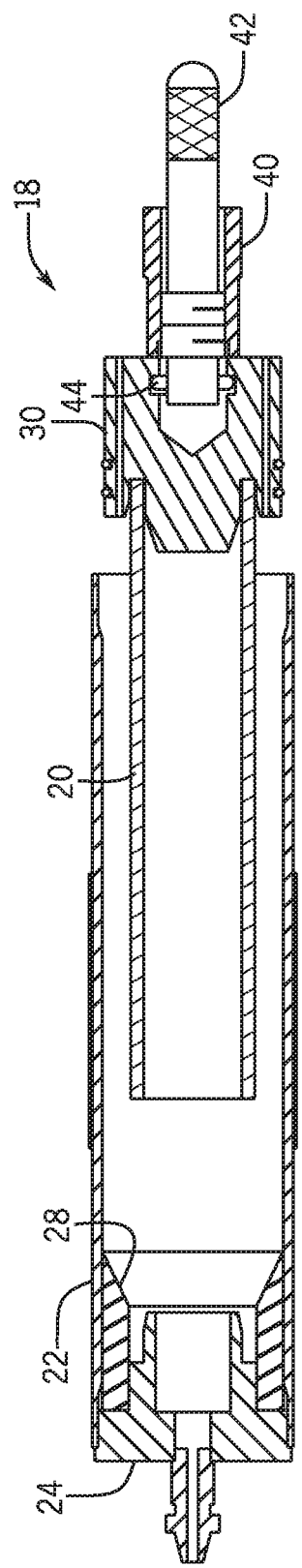
FIG. 10 is a cross-sectional view of one embodiment of the present disclosure, showing removal of the filter for replacement.

In embodiments, the keyed output endcap 30 may be secured into place within the filter body 22 distal from the input endcap 24. As shown in FIGS. 7-10, the keyed output endcap 30 may include a notch comprising at least one pin slot 46 designed to engage with extractor pins 44 on a filter extractor tool 38 to remove the keyed output endcap 30 and filter 20 from the filter body 22. Specifically, the filter extractor tool 38 may comprise an elongate extractor key body 42 having an extractor pin 44 extending through a first end thereof, wherein the extractor pin 44 is substantially perpendicular to the length of the extractor key body 42, and an extractor nut 40 surrounding a middle portion of the extractor key body 42. The keyed output endcap 30 may comprise a notch with pin slots 46 designed to accommodate passage of the extractor pin 44 therethrough. When the extractor tool 38 is rotated within the notch, the extractor pin 44 may be locked within the keyed output endcap 30. A user may then pull on the extractor key body 42 to remove the keyed output endcap 30 and filter 20 from the filter body 22, as shown in FIG. 10. The filter 20 may then be replaced or washed, as desired.

As shown in the Figures, an accumulator endcap 32 may be used to close the end of the filter body 22 distal from the input endcap 24. The accumulator endcap 32 may include an orifice through which air may flow. In some embodiments, this orifice may be designed to engage with a blower extension 34. Alternatively, the orifice may be designed to engage with a nozzle head 36. In either case, the filtered compressed air may flow through the air passages 48 in the keyed output endcap 30 and then out of the wand 18 through the accumulator endcap 32.

The point of use filtered air wand 10 of the present disclosure may be made using any suitable materials and may have any desired or required size. In particular embodiments, the filter 20 may comprise a micro filter, such that the air wand 10 comprises a point of use high flow 0.01 micron filtered air wand. For example, the filter may have a length of from about 3 to about 10 inches and a diameter of from about ½ inch to about 2 inches.

To use the device of the present disclosure, the hose connector 26 may be connected to a hose 16 operatively attached to the air source. Air may then be allowed to flow through the wand and out of the nozzle head 36. Because of the structure of the air wand 10, air may be forced to flow from the hose 16 through the input endcap 24 and into the filter body 22. Within the filter body 22, the air may be forced to flow through the filter 20 due to the end of the filter body 22 being blocked by the keyed output endcap 30. Once it passes through the filter 20, the forced air may flow through air passages 48 in the keyed output endcap 30 and out of the wand through the accumulator endcap 32, wherein the air either flows through the accumulator endcap 32 through the blower extension 34 and out through the nozzle head 36 or directly from the accumulator endcap 32 out through the nozzle head 36. The wand may then be used to use forced compressed air however desired.

While the above description describes the use of compressed air with the wand of the present disclosure, any gas, such as nitrogen, carbon dioxide, or mixed gases, may be used. Additionally, the wand of the present disclosure may be used for compressed air exhaust filtration.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A point of use air wand with a built in filtration system, the air wand comprising:
   a wand comprising a filter body;
   a filter housed within the filter body;
   an input endcap attached to a first end of the filter body, the input endcap operatively attached to an air source;
   an accumulator endcap attached to a second end of the filter body; and
   a keyed output endcap positioned within a second end of the filter body distal from the input endcap, the keyed output endcap comprising:
      a plurality of air passages extending therethrough; and
      a notch comprising at least one pin slot configured to engage with extractor pins on a filter extractor tool to remove the keyed output endcap and filter from the filter body,
   wherein:
      the filter extends along a length of the filter body and engages with slots in the keyed output endcap
      forced air enters the wand through the input endcap, flows through the filter, through the plurality of air passages in the keyed output endcap, and flows out of the wand through the accumulator endcap.

2. The point of use air wand of claim 1, further comprising a filter guide sandwiched between edges of the input endcap and an interior surface of the filter body,
   wherein a first end of the filter is positioned between the filter guide and an inner lip of the input endcap.

3. The point of use air wand of claim 1, wherein:
   the filter extractor tool comprises an elongate extractor key body having an extractor pin extending through a first end thereof;
   the extractor pin is substantially perpendicular to a length of the extractor key body; and
   an extractor nut surrounds a middle portion of the extractor key body.

4. The point of use air wand of claim 1, further comprising a blower extension attached to the accumulator endcap.

5. The point of use air wand of claim 4, further comprising a nozzle head attached to an end of the blower extension distal from the accumulator endcap.

6. The point of use air wand of claim 1, further comprising a nozzle head attached to an end of the accumulator endcap distal from the input endcap.

* * * * *